H. SCHRÖDER.
WEIGHING MACHINE PROVIDED WITH A PRINTING APPARATUS.
APPLICATION FILED APR. 26, 1921.

Patented Aug. 8, 1922.

Inventor
Hermann Schröder
By Knight Bros
Attys

UNITED STATES PATENT OFFICE.

HERMANN SCHRÖDER, OF ESSEN, GERMANY, ASSIGNOR TO FRIED. KRUPP AKTIEN-GESELLSCHAFT, OF ESSEN-ON-THE-RUHR, GERMANY.

WEIGHING MACHINE PROVIDED WITH A PRINTING APPARATUS.

1,425,421.  Specification of Letters Patent.  Patented Aug. 8, 1922.

Application filed April 26, 1921. Serial No. 464,764.

*To all whom it may concern:*

Be it known that I, HERMANN SCHRÖDER, residing at Essen, Germany, a citizen of the German Republic, have invented a certain new and useful Improvement in Weighing Machines Provided with a Printing Apparatus, of which the following is a specification.

The present invention relates to weighing machines provided with a printing apparatus in which the part of the weighing machine which is intended for the reception of the articles to be weighed is connected to a shaft, on the position of which shaft the adjustment of a type drum depends, and in which the shaft is adapted to be locked by a ratchet wheel, in the gaps between the teeth of which a locking member is adapted to engage. In these known weighing machines the parts are so arranged that a position of the shaft in which the locking member engages in a gap between the teeth of the ratchet wheel is corresponded to by an adjustment of the type drum, in which a type lies in the path of a hammer which forms part of the printing apparatus. In an arrangement of the above kind, it may easily happen that the locking member will strike against the head of a tooth of the ratchet wheel during its locking movement and thereby lock the shaft in a position in which a type is unable to enter into the path of said hammer. In this case therefore the printing apparatus would fail to act.

Now the object of the present invention is to obviate this disadvantage.

The invention will be described with reference to the annexed drawings which show, by way of example a weighing machine intended for the weighing of postal parcels.

Figure 1:
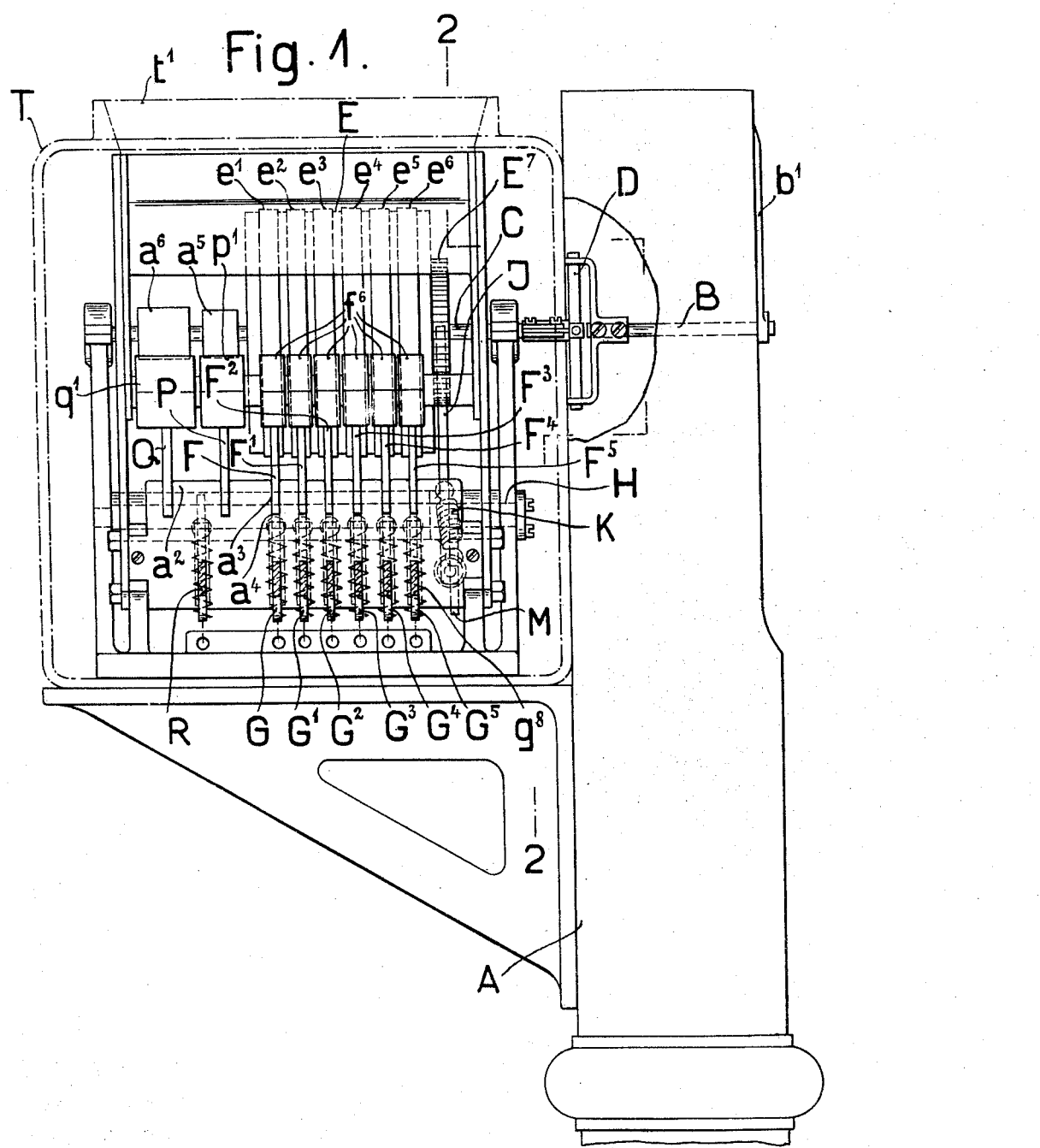
Figure 2:
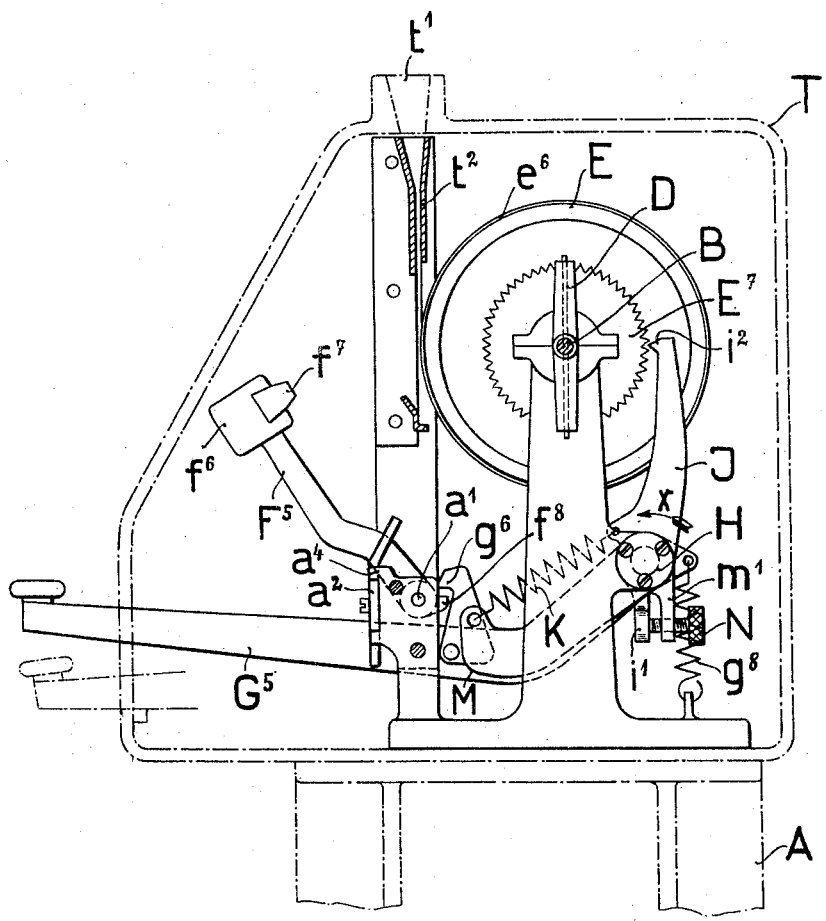
Figure 3:
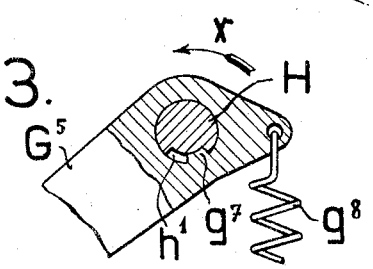

In these drawings:

Figure 1 is an elevation, partially in section, of the weighing machine, certain parts being omitted, Figure 2 is a section on the line 2—2 of Figure 1, seen from the right and Figure 3 is a detail in section, the parts in question assuming the same position as in Figure 2.

Now according to the present invention to the part of the weighing machine which is intended for the reception of the postal parcels which part is not shown, there is positively connected a shaft B carried in bearings in the standard A. This shaft B carries a pointer $b^1$, which works in the well known way, in front of a scale (not visible in the drawing) see Figure 1. In the standard A there is mounted, in bearings coaxially with the shaft B, a second shaft C, which is elastically coupled to the shaft B by a flat spring D. On the shaft C is carried a type drum E. On the peripheral surface of this drum E are provided six annular strips $e^1$ to $e^6$, which are fitted with separate types the strip $e^1$ situated farthest to the left in Figure 1 bearing a continuous succession of weights in kilograms, while the strips $e^2$ to $e^6$ carry types for the postal charge corresponding to the weights and the different districts. The weight types lie in a horizontal line with the corresponding types for the charges.

The several rows of types $e^1$ to $e^6$ have mounted opposite to them levers F to $F^5$ adapted to rock freely about a common fixed shaft $a^1$ and provided on their free ends each with a hammer $f^6$ furnished with a rubber block $f^7$. Under the action of their own weight these levers F to $F^5$, each of which is guided in a slot $a^3$ in a transverse plate $a^2$, tend to always assume the position shown in Figure 2, in which position they rest against the narrow boundary face $a^4$ of the corresponding slot $a^3$. Each of the levers F to $F^5$ has a projection $f^8$ (see Figure 2). These projections $f^8$ each lie in the path of a hook $g^6$ forming a stop (see Figure 1) and carried on corresponding key levers G to $G^5$. The key levers G to $G^5$ are mounted on a common shaft H carried in bearings in the standard A and the lever G, which is the key lever for the weight and lies opposite the strip of types $e^1$ for the weights is mounted rigidly on the shaft H, while the levers $G^1$ to $G^5$, which will be termed the district key levers, each engage by means of a projection $g^7$ in a recess $h^1$ in the shaft H in the manner shown in Figure 3. The key levers G to $G^5$ are so controlled each by the action of a spring $g^8$ that the stop hooks $g^6$, when the key levers G to $G^5$ are in the position of rest (see Figure 2), are distant by a certain amount from the projections $f^8$ on the levers F to $F^5$.

Rigidly connected to the type drum E is a locking wheel $E^7$, which has teeth equal in number to the number of types in one of the rows of types $e^1$ to $e^6$. A pawl J mounted to rock freely on the shaft H is adapted to engage in the gaps between the teeth of the wheel $E^7$. The parts are so arranged that when the pawl J engages fully in a gap of the locking wheel $E^7$ a type of the corresponding row of types $e^1$ to $e^6$ lies in the path of the hammers $f^6$. The pawl J is connected by a spring K to a lever M which is rigidly mounted on the shaft H. On a projection $m^1$ of the lever M is mounted a set screw N, which bears against a projection $i^1$ on the pawl J (see Figure 2. By means of this set screw N the position of the pawl J with respect to the lever M and consequently with respect to the locking wheel $E^7$ can therefore be regulated. Now, the pawl J is so adjusted by the set screw N that when the several parts are in the position shown in Figure 2 the nose $i^2$ of the pawl projects to a slight extent into the gap between two of the teeth of the locking wheel $E^7$. Finally there are also mounted to rock freely on the shaft $a^1$ two levers P and Q provided each with a hammer $p^1$ and $q^1$ respectively, (see Figure 1). The hammer $p^1$ of the lever P lies opposite a type carrier $a^5$ bearing the name of the place and mounted in the standard A and the hammer $q^1$ of the lever Q opposite a type carrier $a^6$ provided with adjustable types for indicating the date and likewise mounted in the standard A. The two levers P and Q are constructed in the same manner as the levers F to $F^5$. The projections on the levers P and Q both lie in the path of a common hook-shaped stop of corresponding breadth and mounted on a key lever R, which is fast on the shaft H.

The several parts of the above described apparatus are enclosed in a casing T (indicated by dot and dash lines in the drawing) and from which merely the various key levers project (see Figure 2). In the upper part of the casing T there is provided a slot $t^1$, which serves for the insertion of the parcel card which is to be stamped and adjoining which is a guide $t^2$ for the card. Between the hammers of the various type levers on the one hand and the type drum E and the type carriers $a^5$ and $a^6$ on the other hand there is provided an inked ribbon (not shown) which lies directly in front of the types. By means of a special feed mechanism (likewise not shown) the ribbon is automatically fed forwards.

In using the above described apparatus the parcel to be weighed is laid upon the weighing machine. Under the action of the weight of the parcel and in dependence thereon the shaft B with the pointer $b^1$ rotates and finally comes to rest. The rotation of the shaft B is transmitted through the flat spring D to the shaft C. During the rotation of this latter the pawl J, the nose $i^2$ of which projects slightly into the path of the teeth of the locking wheel $E^7$, trails over the teeth of this latter. During this action of the pawl, every time the nose $i^2$ on it strikes against a locking tooth, the flat spring D is slightly stressed owing to the action of the spring K before the nose $i^2$ slides past over the particular tooth of the locking wheel. In consequence of this the point of the nose $i^2$ of the pawl J can never lie opposite the point of a tooth of the locking wheel $E^7$ when this latter comes to rest. For if the weight of the parcel is so great that if the staft B comes to rest the pawl J is still just forced out of its path by the adjacent tooth of the locking wheel $E^7$, then, at the instant the points of the nose $i^2$ of the pawl and of the particular tooth of the locking wheel are opposite each other, the stress of the flat spring D is relaxed, and consequently the shaft C and with it the locking wheel $E^7$, are still rotated a slight amount further, until the flat spring D is without stress. The nose $i^2$ of the pawl accordingly again lies in a gap between two teeth of the locking wheel $E^7$.

After the pointer $b^1$ has come to a standstill the card appertaining to the parcel in question, which card in the meantime has been introduced into the slot $t^1$ with the side to be stamped in front of the type drum E, is stamped. For this purpose only that district key lever is depressed, which correspond to the district where the parcel is to be sent, that is to say for example the lever $G^5$. When the district key lever $G^5$ is depressed the shaft H is rotated, by the action of the projection $g^7$; in the direction of the arrow $x$ (see Figures 2 and 3).

The other district key levers $G^1$ to $G^4$ do not participate in this rotation as the recesses $h^1$ permit the shaft H to rotate in the direction of the arrow $x$ relatively to these district levers which are not operated. On the other hand the key levers G and R which are rigidly mounted on the shaft H are rotated therewith and likewise the lever M. When the lever M is rotated the pawl J is carried with it by the spring K and, eventually against the action of the flat spring D, caused to engage completely with its nose $i^2$ in the particular gap between two teeth of the locking wheel $E^7$. By this means the type drum E is locked and moreover in a position in which each a type lies in the path of the several hammers $f^6$. The particular type in the row $e^1$ indicates the weight of the parcel in kilograms and the type in row $e^6$ the postal charge to be paid for the parcel. On the further rotation of the key levers R, G and $G^5$, during which the spring K is merely still further stressed, the stop hooks $g^6$ finally strike against the projections $f^8$ and the levers Q, P, F and F⁵ with their hammers f⁶ will be struck against the types lying in their paths. When this takes place the lever Q prints the date, the lever P the name of the place, the lever F the weight in kilograms and the lever F⁵ the charge, all these data being printed on the parcel card. Finally the key lever G⁵ assumes the position shown by dot and dash lines in Figure 2. After the parcel card has been stamped the district key lever G⁵ is released and the parcel removed from the weighing machine. The various parts of the apparatus thereupon again return to their position shown in the drawing as can be seen without any further explanation. The parcel card is then removed from the slot t¹ and the apparatus is ready for use for a fresh weighing and stamping.

Claims.

1. In a weighing machine provided with a printing apparatus, a type drum, said drum being adjusted in accordance with the weight of the material to be weighed, a toothed locking wheel rotatable with said drum, an elastic coupling between said type drum and weighing machine, a locking member projecting between the teeth of said locking wheel and spring means for holding said locking member in the path of said teeth.

2. In a weighing machine provided with a printing attachment, a type drum, the adjustment of said drum depending upon the weight of the material to be weighed, a toothed locking wheel, a shaft to which said drum and locking wheel are rigidly connected, an elastic coupling between said shaft and the weighing machine, a locking member cooperating with said toothed locking wheel and a spring for maintaining said locking member projecting between the teeth of said locking wheel.

3. In a weighing machine provided with a printing attachment, a type drum and shaft therefor, a toothed locking wheel, said type drum and locking wheel being keyed to rotate with said shaft, the rotation of said type drum depending upon the weight of the articles to be weighed, an elastic coupling connecting said shaft to said weighing machine, a shaft supporting a plurality of key levers, a locking pawl pivoted upon said shaft, a lever rigidly secured to said shaft, spring means connecting said pawl to said last mentioned lever, and an adjustable connection between said pawl and lever acting in opposition to said spring.

4. In a weighing machine provided with a printing apparatus, a type drum provided with a plurality of rows of type, a locking wheel, a shaft to which said drum and locking wheel are keyed, the adjustment of said shaft depending upon the weight of the articles to be weighed, a flexible coupling between said weighing machine and said shaft, a key lever shaft, a plurality of key levers mounted on said shaft and corresponding to the number of rows of type on said type drum, a locking pawl journalled on said shaft and a lever fixed thereto, spring means connecting said pawl and lever for holding said pawl adjacent said locking wheel, said key lever shaft being formed with a recess, said key levers being provided with a projection permitting a mutual rotation of said shaft and said key levers.

The foregoing specification signed at Essen, Germany, this 1st day of March, 1921.

HERMANN SCHRÖDER.